R. H. BOLIN.
GLASS FURNACE.
APPLICATION FILED AUG. 4, 1908.
1,163,584.
Patented Dec. 7, 1915.
4 SHEETS—SHEET 4.
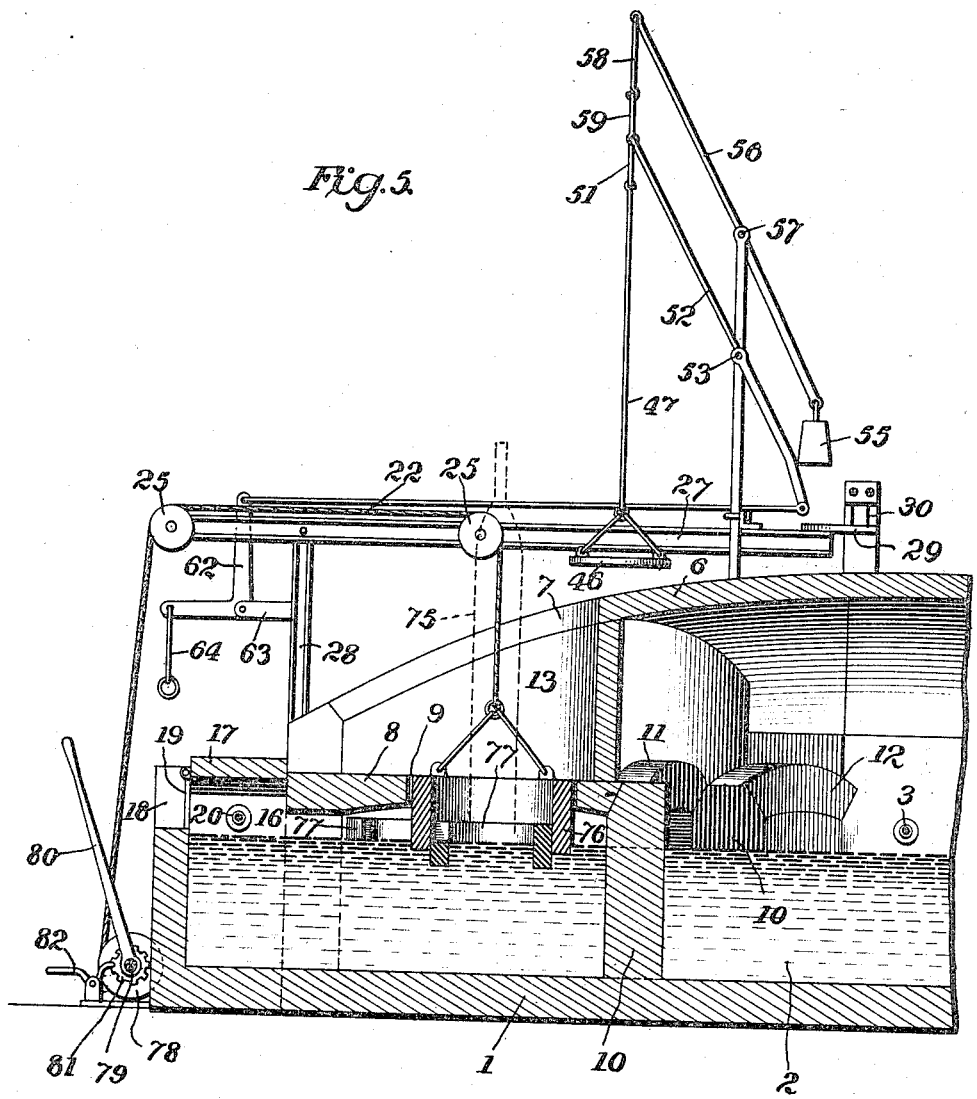
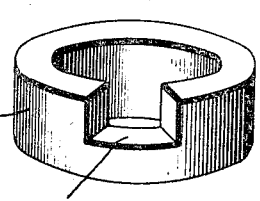

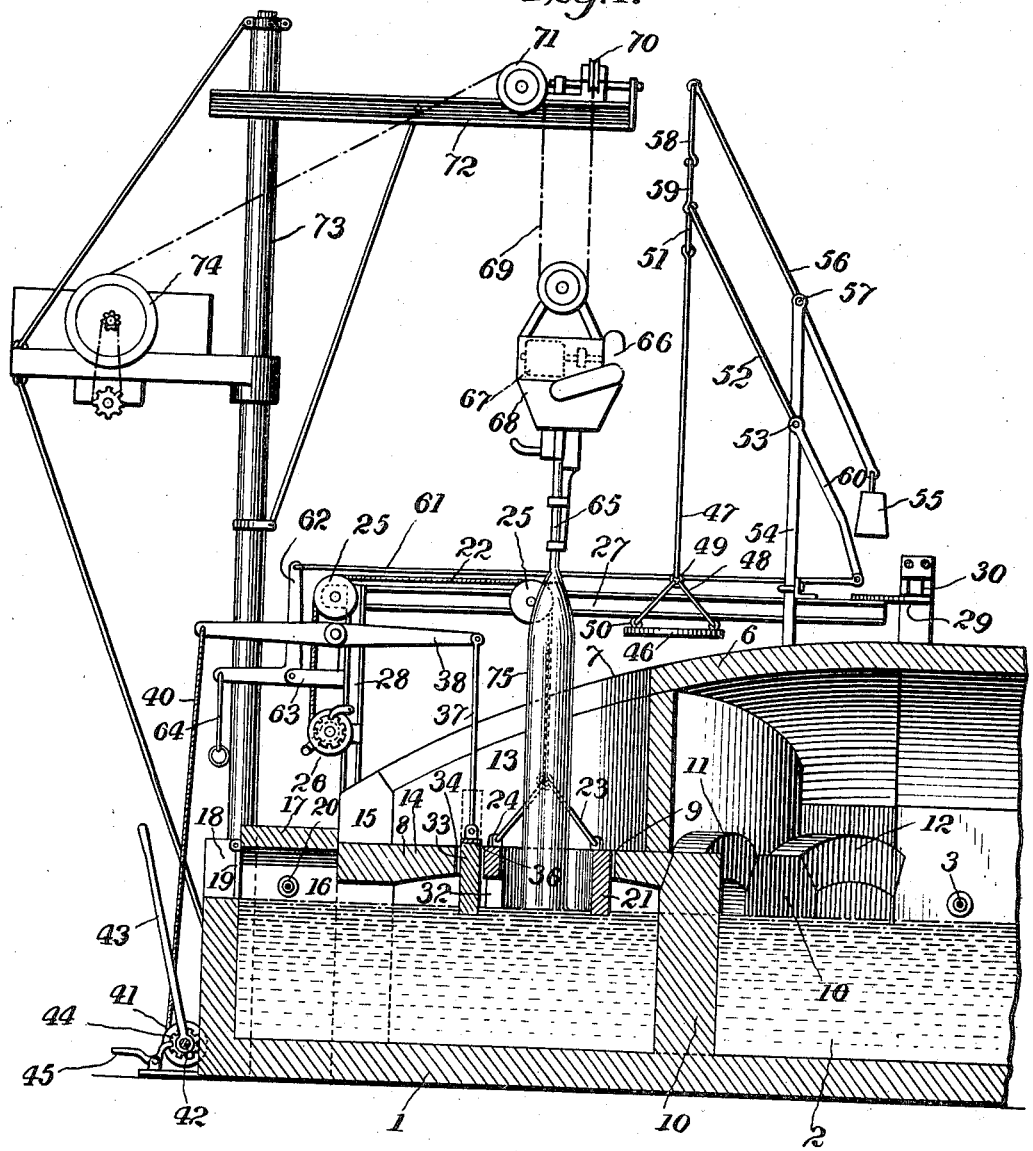
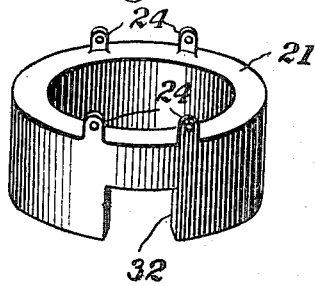

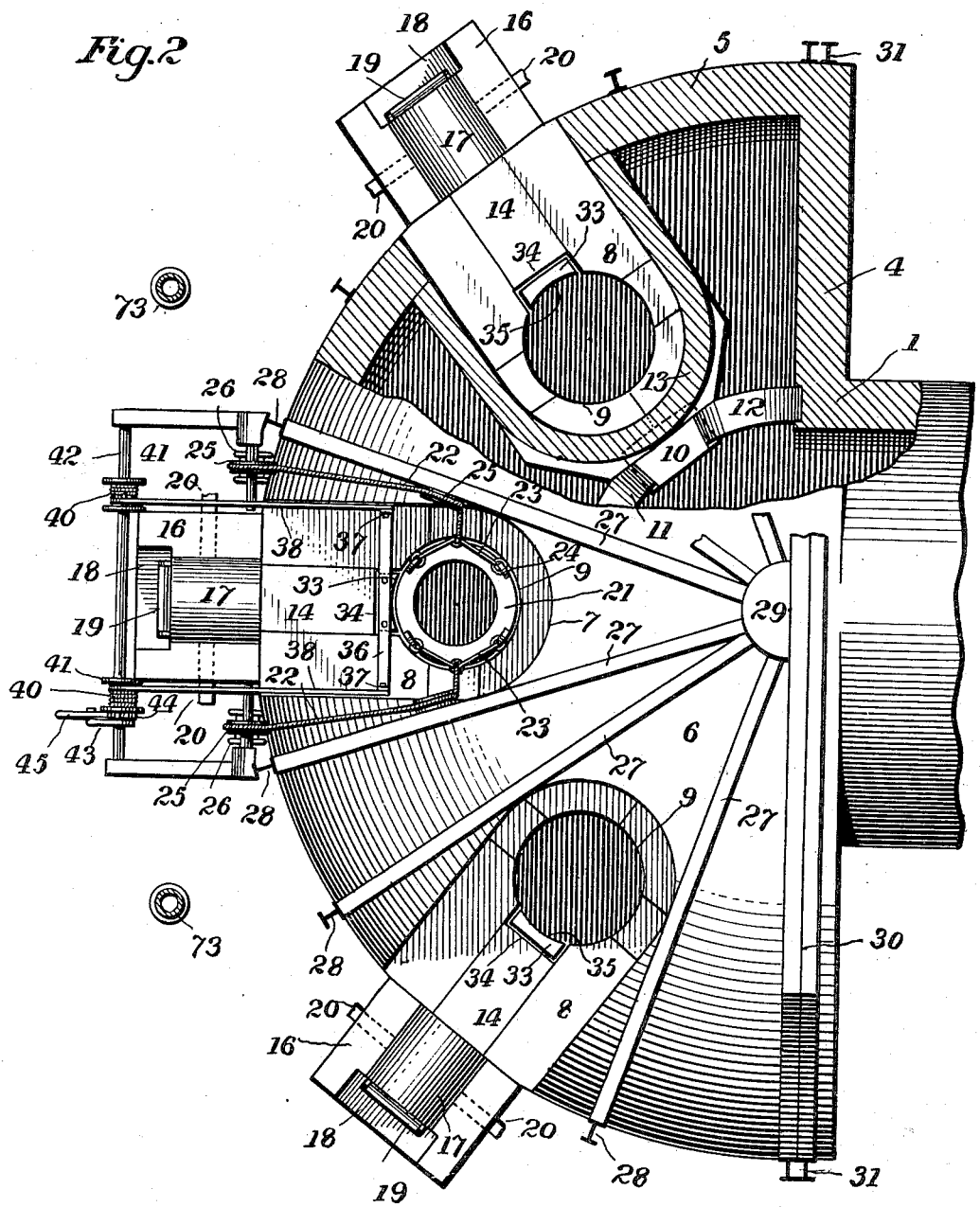

UNITED STATES PATENT OFFICE.

RICHARD H. BOLIN, OF KANE, PENNSYLVANIA, ASSIGNOR, BY MESNE ASSIGNMENTS, TO CONSOLIDATED MACHINE COMPANY, OF BRADFORD, PENNSYLVANIA, A CORPORATION OF DELAWARE.

GLASS-FURNACE.

1,163,584.

Specification of Letters Patent.

Patented Dec. 7, 1915.

Application filed August 4, 1908. Serial No. 446,873.

*To all whom it may concern:*

Be it known that I, RICHARD H. BOLIN, a citizen of the Dominion of Canada, residing at Kane, in the county of McKean and State of Pennsylvania, have invented certain new and useful Improvements in Glass-Furnaces, of which the following is a specification.

This invention relates to an improved process and apparatus for drawing hollow glass articles, such for example as hollow cylinders for window glass by what is known as "machine glass drawing".

In order to more fully describe my said invention reference will be had to the accompanying drawings which show forms of apparatus embodying my present invention for carrying out my improved process, and wherein:—

Figure 3:
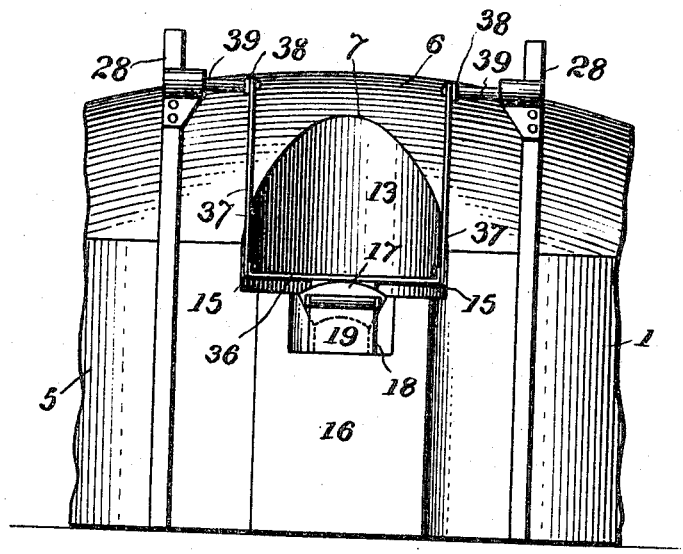
Figure 4:
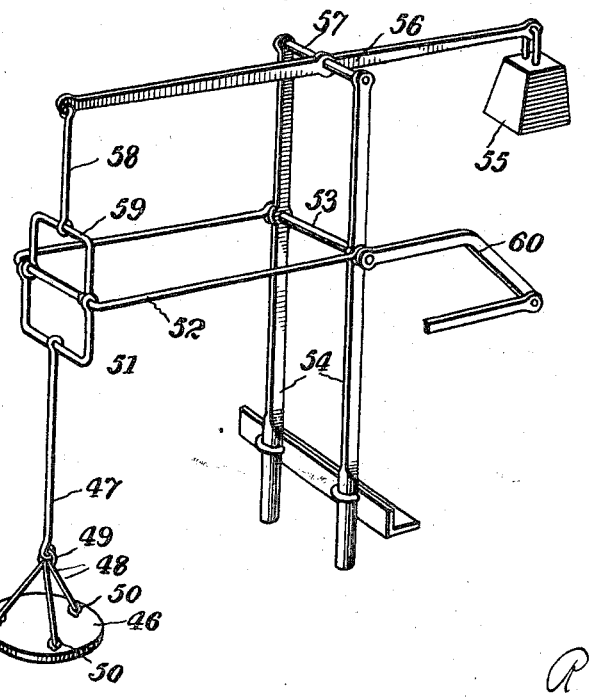

Figure 1, is a fragmentary sectional view of one end of a glass tank and accessories embodying my present invention, and showing in elevation drawing apparatus in the act of drawing a cylinder from the glass in said tank; Fig. 1ª, a detail perspective view of one of the drawing rings; Fig. 2, a top plan view partly in section of the tank shown in Fig. 1, with some of its accessories removed; Fig. 3, a fragmentary front elevation of the tank shown in Fig. 2; Fig. 4, a detail perspective view of the lever mechanism herein shown for hoisting the covers for the drawing rings; Fig. 5, a fragmentary sectional view partly in elevation of a tank and accessories embodying my present invention but different from the form shown in Fig. 1, and Fig. 6, a detail perspective view of one of the floating rings for use in the apparatus shown in Fig. 5.

Referring first to Figs. 1 to 4 of the accompanying drawings, 1 represents the glass tank containing molten glass 2, the heat for which may be supplied through burners 3 in the usual or any desired way. Except as to that portion of the tank where the drawing takes place, this tank may be of any desired construction; but as to said glass drawing portion, it is of novel construction especially adapted to the carrying out of my improved process. In carrying out this part of my invention, I provide the tank, in the case shown, with a nose constructed by building out from the main side walls of the tank, wing walls 4, which are joined at their outer edges by a wall 5 built on the arc of a circle, the said nose being provided with a dome-like curved top 6, in which are made a series of substantially horse-shoe shaped openings 7 of any desired number. In the nose of the tank are a series of more or less flat arches or bridges 8, of refractory material, arranged beneath the respective openings 7, and each of these arches is itself provided with a central opening 9 passing through it. These arches 8 are supported at their outer ends upon the front wall 5 of the tank and at their inner edges each upon a separate pier 10 of a series of refractory piers rising from the bottom of the tank to a point above the normal level of the glass 2 therein. These piers 10 are braced by arches 11 extending from pier to pier and by arches 12 extending from the end piers to the side walls of the tank. The space above the openings 9 in the arches 8 is walled in back and sides by walls 13, of a suitable refractory material, extending from said arches up to the tank top. Each of the arches 9 is cut away to form a substantially flat upper face 14, and the front wall 5 of the tank nose is cut away as at 15 in front of each of said arches down to a line with the flat upper faces of said arches. Built out in front of each glass drawing opening of the tank is an extension or pocket 16 covered over by a short arch 17 and provided with a front opening 18, above the glass level, having a hinged door 19. Each of said pockets is provided with two or more burners 20.

Mounted in each of the openings 9 is a refractory ring 21 normally supported to extend a short distance into the molten glass. These rings may be supported in any desired way though I prefer in the present instance to suspend them so that they may be raised and lowered at will. The arrangement which I have shown for supporting these rings consists in suspending each ring from two cables 22 which are attached through suitable links 23 to refractory lugs 24 on the rings, and pass over pulleys 25 and thence each to a winding drum 26. The pulleys 25 are supported on horizontal I-beams 27 which are supported at their outer ends upon uprights 28 and at their inner ends are made fast in any suitable way, as by means of bracket 29, to a pair of horizontal I-beams 30 which extend across the top of the furnace, the said horizontal I-beams being supported upon uprights 31. Each ring 21 has an opening 32 through its side, and these rings are so supported that said openings lie each directly in front of its respective pocket 16. Mounted for vertical movement in front of each of these openings is a refractory screen 33 for which there is provided in each opening 9 a cut away portion 34, permitting the screen to travel vertically in close proximity to the outside of the ring. Each of these screens 33 is preferably concave as at 35 (see Fig. 2) on its face next to the ring to permit its conforming to the curvature of the outside of said ring. Any suitable means may be provided for supporting these screens. That which I have herein shown consists, for each screen, in securing the screen to a bar 36 to the ends of which are secured rods 37 attached to levers 38 fulcrumed on brackets 39. The power arms of these levers are connected by cables 40 to drums 41 on a shaft 42 provided with a lever 43 for operating the same, and a ratchet 44 and a pawl 45 for holding the shaft in the desired position. For each of the rings 21, I provide a removable cover plate 46 of refractory material, each of which, in the case shown, is suspended by a cable or rod 47 secured at one end through link and ring connection 48—49 to lugs 50 on the upper face of the cover, and its other end to a frame 51 loosely secured to the yoke of a U-shaped frame 52 the arms of which are made fast to a shaft 53 mounted to turn in uprights 54 made fast to the I-beams 27. The cover 46 is counterbalanced by a weight 55, secured to one end of a lever 56 fulcrumed on a shaft 57 mounted in the upper ends of the uprights 54, the other end of said lever being connected through links 58 and 59 to the yoke of the frame 52. By thus counterbalancing the cover plate 46, very little power is required to raise it. For the purpose of operating this mechanism to raise and lower the covers 46, I make fast to the shaft 53 an arm 60 and connect this through a rod 61 to a bell crank lever 62 fulcrumed in a bracket 63 secured to one of the uprights 28. For the purpose of operating the bell crank levers 62, I may attach to each a rod 64. By means of this arrangement the covers 46 may be easily lifted from the rings, and in rising from the rings the covers travel back out of the way of the drawing mechanism, so as not to interfere with the drawing of the cylinder. The cylinder blowing and hoisting mechanism may be of any desired kind, though preferably of the kind shown wherein air is supplied to the blowpipe 65 from a rotary blower 66 driven by an electric motor 67 directly connected thereto, and wherein the said blowpipe, blower and motor are all supported upon a carriage 68 freely suspended by a cable 69 which passes over pulleys 70, 71 on the boom of a rotatable crane 73 and thence to hoisting mechanism 74 carried by said crane. The speed of the blower motor as well as that of the hoisting mechanism is controlled electrically in any suitable way.

One way of performing my improved process, and the operation of the apparatus above described for carrying out said process is as follows: It is assumed that the crane 73 is turned to a position 180° from that shown in Fig. 1; that cover 46 is resting upon ring 21 and that screen 33 is raised to the position shown in dotted lines in Fig. 1. An attendant then operates lever 62 and raises the cover plate 46, the latter automatically shifting back out of the way of the drawing opening to the position shown in Fig. 1. The attendant next releases pawl 45 and operates lever 43 to lower the screen so that it covers the opening 32 in the ring. The crane is then swung around to a position where the blowpipe will be in a position immediately above the center of the ring 21, the bait of the blowpipe having been previously heated. The blower motor is then started up and the hoisting mechanism caused to operate so as to lower the blower carriage. This lowering is kept up until the bait of the blowpipe passes a suitable distance into the molten glass, when the hoisting mechanism is reversed, and the blowpipe carriage started slowly upward, continuing this motion until the cylinder 75 has reached the desired length, when the latter is severed near its lower end in any desired way from the portion extending into the molten glass. The crane with the cylinder suspended from the blowpipe is swung around so that the depending cylinder will clear the furnace, after which the cylinder may be taken down and "capped off" in any desired way. As soon as the cylinder has been swung clear of the drawing opening in the furnace the screw 33 is lifted and an attendant opens door 19 and inserts a long tool or rod through openings 18 and 32 and draws the glass from the interior of the ring 21 which has become chilled during the drawing, through opening 32 into the pocket 16 where, by commingling with the more highly heated glass in said pocket and also by being subject to the extra heat of the burners 20, this glass, from the drawing zone created by the ring 22, becomes of uniform fluidity and temperature with the rest of the glass. This operation finished, the door 19 is closed, and the cover 46 is lowered upon the top of the ring 21. The parts are allowed to remain in this position for a short while, after which the drawing may be repeated.

Another form of apparatus embodying my invention is shown in Fig. 5. In this

I replace the ring 21 and screen 33 by a ring 76 and one or more, preferably a plurality, of floats 77. The ring 76 is of refractory material and is substantially the same as rings 21 except that it has no opening in its side and may be suspended by cables 22 in the same manner as rings 21. The cables 22 in the apparatus shown in Fig. 5, however, instead of being wound upon drums 26, are preferably wound on drums 78, mounted on a common shaft 79 to which is made fast a lever 80, the said shaft carrying a ratchet 81 adapted to be engaged by a locking pawl 82. The parts 78 to 82 correspond to the parts 41 to 45 of the preceding figures. The floats 77 consist each of a refractory ring having a portion of its upper edge cut away to form an opening 83. These floats are preferably of such exterior diameter and shape as to make a sliding fit with the bore of the rings 76, and are of such buoyancy that the bottom of the opening 83 will be normally a short distance below the surface of the glass so as to allow the glass in said float to be skimmed and the skimmings drawn through said opening. The opening 9 in the arch or bridge 8 in the form of apparatus shown in Fig. 5 makes a close sliding fit around the ring 76, in which case the slot 34 (see Fig. 1) is dispensed with. In all other respects the apparatus shown in Fig. 5 is the same as shown in the preceding figures.

To draw a cylinder with the apparatus shown in Fig. 5, a float 77 is pushed through the molten glass into the position shown directly beneath the center of the drawing opening 9, the ring 76 is lowered to envelop the float as shown, the blowpipe lowered into the glass within the float and the cylinder drawn as herein described or in any desired way. The lower part of the cylinder is then severed from the portion extending into the molten glass and the part suspended from the blowpipe carried off for taking down. Then, or as soon as the cylinder is severed, an attendant releases pawl 32, and by operating lever 80 raises ring 76 up clear of the float and the cover 46 is lowered on top of the ring 76 by operating handle 64. After ring 76 is raised clear of the float, this float is pushed out into a hotter portion of the tank in order that the chilled glass in said float may be remelted. When the float has remained a sufficient time in this latter position, or, in other words, when the chilled glass has been sufficiently heated, the contents of the float are skimmed and drawn through the opening 83 preferably out into one of the extensions 16 where these skimmings are subject to the heat of the auxiliary burners 20. One of the previously used floats which has been during the drawing operation described floating in the molten glass and which has had its contents skimmed and reheated as described, is pushed over into position beneath the drawing opening of the tank, the cover 46 removed and the process repeated. The skimming and the pushing of the floats around in the molten glass may be effected by an attendant through opening 18, for which purpose he may use an ordinary skimming tool.

Obviously any desired number of floats may be used for each drawing opening although in the drawing I have indicated but two. It should be further understood that while I have herein shown the rings 21, 76 and floats 77 of circular form I may make them of any desired shape. Other modifications and changes may be made in my said invention without departing from the spirit thereof.

What I claim as my invention is:—

1. A tank furnace for molten glass, provided with an opening through which glass articles may be drawn from the molten glass in said furnace, a refractory screen extending from said opening down into said furnace, a second refractory screen located in proximity to the first, there being an aperture through one of said screens to permit skimming of the glass to take place therethrough, and means to cause relative movement between said screens to effect the opening and closing of said aperture.

2. A tank furnace for molten glass, provided with an opening through which glass articles may be drawn from the main body of the molten glass in said tank, a refractory screen extending from said opening down into said tank, a second refractory screen located in proximity to the first, there being an aperture in one of said screens to permit the skimming of the glass to take place therethrough, means to cause relative movement between said screens to effect the opening and closing of said aperture, and a pocket formed in the side of the tank and in direct communication with the main body of the tank adapted to permit the skimming of the glass from the drawing zone in the main body of the glass into said extension, and auxiliary heating means in said extension to heat said glass.

3. The combination with a glass furnace tank adapted to contain molten glass, of a refractory annulus adapted to float in the glass in said tank, said float having an opening in its side through which its contents may be skimmed, and a refractory annulus substantially concentric with said float and mounted for vertical movement in proximity thereto and adapted to coöperate with said float to screen a given area or zone above the glass level from the surrounding heat of said tank.

4. A furnace for molten glass, having a refractory bridge extending over the main body of the molten glass in said furnace, said bridge having an opening to permit the drawing of glass articles therethrough from the molten glass within said furnace, a refractory annulus mounted for vertical movement in said opening, one or more floating refractory annuli in the molten glass in said tank adapted to be brought into alinement with said annulus, said annuli being provided with a skimming opening, and an extension pocket in direct communication with the main body of the glass in said tank arranged to permit the skimmings from said floating annuli to be floated thereinto, and auxiliary heating means in said pocket to heat the said skimmings.

In testimony whereof I affix my signature in presence of two witnesses.

RICHARD H. BOLIN.

Witnesses:
  JESSIE HOOVER,
  FRANK DONOVAN.

Copies of this patent may be obtained for five cents each, by addressing the "Commissioner of Patents, Washington, D. C."